United States Patent [19]
Koolen

[11] Patent Number: 5,767,458
[45] Date of Patent: Jun. 16, 1998

[54] LOW-PASS FILTER OF GRAPHICAL TABLET HAS CUT-OFF FREQUENCY LOWER THAN SAMPLING FREQUECY

[75] Inventor: Gerardus J.K.M. Koolen, Eindhoven, Netherlands Antilles

[73] Assignee: U.S. Philips Corporation, New York, N.Y.

[21] Appl. No.: 603,958

[22] Filed: Feb. 20, 1996

[30] Foreign Application Priority Data

Feb. 21, 1995 [EP] European Pat. Off. .............. 95200432

[51] Int. Cl.$^6$ .............................. G08C 21/00; G09G 3/02
[52] U.S. Cl. .................. 178/18; 178/19; 345/173; 345/174
[58] Field of Search ........................ 178/18, 19, 20; 345/173, 174, 179

[56] References Cited

U.S. PATENT DOCUMENTS

| | | | |
|---|---|---|---|
| 4,581,483 | 4/1986 | Ralston | 178/18 |
| 4,616,107 | 10/1986 | Abe | 178/19 |
| 4,752,655 | 6/1988 | Tajiri et al. | 178/20 |
| 5,225,636 | 7/1993 | Protheroe | 178/19 |
| 5,231,381 | 7/1993 | Duwaer | 340/712 |
| 5,359,156 | 10/1994 | Chan et al. | 178/19 |
| 5,528,002 | 6/1996 | Katabami | 345/179 |
| 5,600,105 | 2/1997 | Fukuzaki | 178/19 |

FOREIGN PATENT DOCUMENTS 9424648 10/1994 WIPO .

*Primary Examiner*—Curtis Kuntz
*Assistant Examiner*—Vijay Shankar

[57] ABSTRACT

A graphical tablet includes a pair of parts to be brought into electrical contact with one another under user-interaction. Electrical signals are generated indicative of X and Y coordinates of the contact. The signals are filtered by a low-pass filter. The filtered X and Y signals are sampled with a particular sampling frequency and are held in separate X and Y holding circuits. The cut-off frequency of the filter is at least part of the time substantially lower than the sampling frequency, as each holding circuit has to settle for only increments and decrements relative to its stored sample value. Thus the spectrum of noise rejection is widened with respect to the prior art.

11 Claims, 2 Drawing Sheets

LOW-PASS FILTER OF GRAPHICAL TABLET HAS CUT-OFF FREQUENCY LOWER THAN SAMPLING FREQUECY

BACKGROUND OF THE INVENTION

1. Field of the Invention

The invention relates to a data processing system with a data input device for enabling entering respective data into the system upon user-interaction at respective first and second coordinates relative to the device. The device includes generating means for generating signals indicative of the first and second coordinates, low-pass filter means for filtering of the signals, and sampling means for sampling of the filtered signals with a sampling frequency.

2. Background Art

Graphical user-interfaces have become widespread in the field of data input devices as highly suitable means to communicate with a data processing system. Examples of graphical user-interfaces are touch screens and graphical tablets that enable a user to selectively enter data into the system by touching a screen at predetermined locations and by manipulating a stylus contacting the surface of the tablet, respectively. U.S. Pat. No. 5,231,381 (PHN 13,100) discloses an attractive example wherein a touch screen and a graphical tablet are combined with an LCD into a multiple-purpose graphical user-interface device. The touch screen and graphical tablet have functionally different detection mechanisms so as to avoid mutual interference. As the present invention relates particularly, but not exclusively, to user-interfaces that include a graphical tablet, some well known examples of detection mechanisms used in graphical tablets are discussed below.

A first example of graphical tablet probes with a stylus a DC voltage established across an electrically resistive layer. The DC voltage has a gradient in a particular direction so as to unambiguously associate the voltage level with a coordinate in that direction. Such tablet is referred to herein below as a resistive tablet. See, e.g., international application WO 94/24648. A second example of graphical tablet employs a top film resistor facing a bottom film resistor. A stylus is used to depress the top film to bring it into electrical contact with the bottom film. A voltage gradient is established across one of the films and the other film is used to measure the voltage at the contact point. The measured voltage is representative of the location of the point of contact. Such tablet is referred to herein below as a membrane tablet.

The accuracy of both resistive and membrane tablets is found to be hampered by all sorts of noise. One of the major sources of noise is considered to be contact noise, stemming from a wildly varying resistance of the contacting parts, such as stylus and resistive layer of the resistive tablet, and the films of the membrane tablet. The contact resistance typically sweeps across a range of 1 ohm to 100K ohms, i.e., five orders of magnitude. The variation is thought to derive at least partly from the contacting surfaces being physically inhomogeneous, e.g., having a rough uneven surface at the relevant scale.

Another major noise source that affects accuracy is the display with which such tablets usually are combined to serve as a visual feedback. For example, in case of the display including an LCD, the so-called M-signal causes radiation that is picked up by the resistive layers or by at least one of the films. The undesirable effects of noise are somewhat mitigated by use of filters such as a low-pass filter either in software or in hardware. The radiation noise effects could be reduced by synchronizing the operation of the tablet with that of the display. The tablet then is active only during time slots wherein the display is relatively quiet.

OBJECT OF THE INVENTION

It is, inter alia, an object of the invention to provide a data processing system with a low-cost, high-performance graphical user-interface device whose accuracy is higher than that of the conventional devices.

SUMMARY OF THE INVENTION

To this end, the invention provides a system as specified in the preamble, characterized by the following features. The sampling means comprises first holding means for holding a first sample associated with a value of the first coordinate, and second holding means for holding a second sample associated with a value of the second coordinate. The device further comprises filter control means operative to decrease at least temporarily a cut-off frequency of the filter means substantially below the sampling frequency.

The inventor has recognized that dividing the sampling means into separate holding means for each coordinate individually enables decreasing the settling time with respect to a single holding means used for both coordinates alternately. This owes to the fact that a particular one of the holding means is permitted to retain its previous sample value and only needs to adapt to an increment or decrement for the next value. That is, each holding means only needs a time for the differential value to settle. In operational use of the graphical tablet for input of, e.g., handwriting, consecutive samples will differ only marginally. According to the invention, the cut-off frequency can be lowered well below the sampling frequency, i.e., the rate at which each of the holding means is supplied with samples. As a consequence, the bandwidth is decreased to reject a wider band of noise. Note that this is impossible for a device using a single sample-and hold circuit for handling X and Y coordinates alternately, as the full sample value must be allowed to settle each sampling cycle after reset.

When the user starts entering data, or when the user enters data in the form of intermittent dots, the full settling time is needed so that the full sample value can be acquired. This requires temporarily raising the cut-off frequency to or above the sampling frequency. Accordingly, the inventor has realized that the cut-off frequency therefore is preferably varied in the following manner. When the input device does not receive a stimulus from the user the cut-off frequency is zero, i.e., the filter means is off. Upon detection of the stimulus, the cut-off frequency is initially raised to a high value, preferably much higher than the sampling frequency. Subsequently, the cut-off frequency is lowered to well below the sampling frequency.

Typically, low-pass filter means comprises an integrating network with a resistance between input and output and a capacitance connected to the output. In the invention the first and second holding means comprise first and second capacitances, respectively, that are selectively connected to the filter's resistance via controlled switches so as to merge the holding means with the filter means. The effective cut-off frequency now can be varied by changing the duty cycle of the signal controlling the switches. The duty cycle control is preferably made dependent on the initialization of the user-interaction. The duty cycle then is first made large, e.g., 100% and thereupon decreased to, say, 10%.

Preferably, the filter control means is operative to control the cut-off frequency in dependence on a noise-related quantity. For example, the device may include a pair of parts operative to be brought into electrical contact with one another under user-interaction for enabling generation of the signals indicative of the first and second coordinates of the contact relative to the device. The filter control means then may control the cut-off frequency in dependence on a contact resistance of said parts. Alternatively, or subsidiarily, the cut-off frequency could be controlled in dependence on the radiation noise of a display integrated with the data input device. An elegant manner to achieve the dependence on contact resistance is to functionally integrate the contact resistance with the low-pass filter means. When the contact resistance increases, the bandwidth should decrease in order to reduce the effects of contact noise. The inventor has recognized the fact that this functional integration can be applied to, among other things, both the resistive tablet and the membrane tablet discussed above. The principle of the invention also can be applied to a variety of touch screens.

DESCRIPTION OF THE DRAWINGS

The invention is explained below in further detail and by way of example with reference to the accompanying drawing, wherein.

Throughout the drawing like reference symbols indicate corresponding or similar features.

DETAILED DESCRIPTION OF THE PREFERRED EMBODIMENTS

Block diagram of general system

Figure 1:
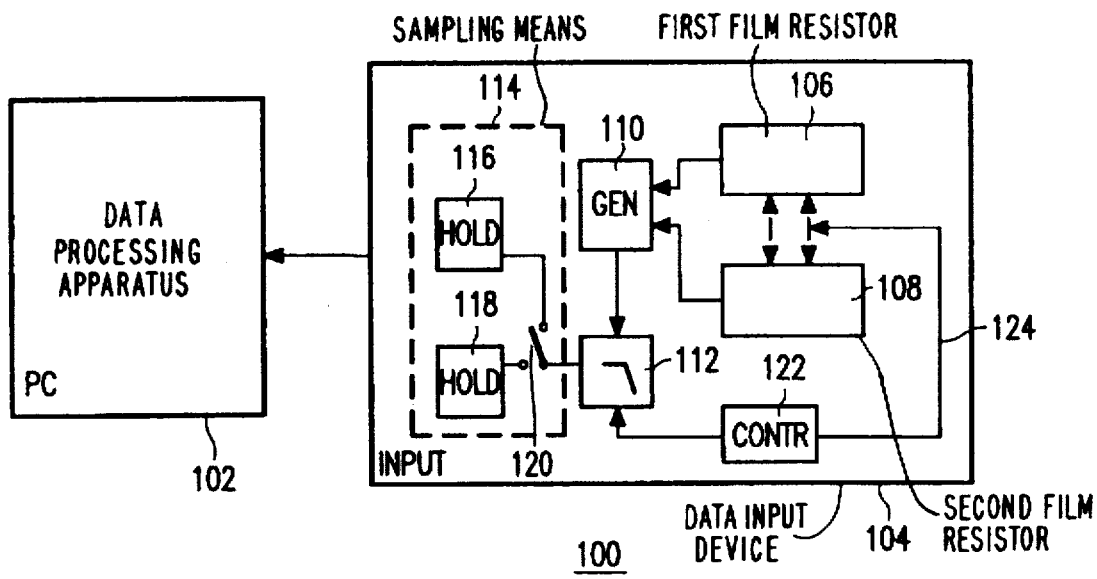
FIG. 1 is a block diagram of a system in the invention.

FIG. 1 is a block diagram of a system 100 according to the invention. System 100 comprises a data processing apparatus 102, such as a PC, and a data input device 104 that is coupled to or functionally integrated with apparatus 102. Device 104 is comprised of a first part 106 and a second part 108 that are to be brought into electrical contact with one another under user-interaction. Device 104 is, for example, a graphical tablet to enable entering data with a stylus. Parts 106 and 108 are, for example, a stylus and a resistive layer, or two film resistors as explained above. Establishing the electrical contact causes generating means 110 to generate electrical signals indicative of an X coordinate and an Y coordinate relative to device 104. As this mechanism is known, reference is made to the general background art of graphical tablets for further information.

Device 104 also includes low-pass filter means 112 for filtering of the signals, and sampling means 114 coupled to an output of filter means 112 for sampling of the filtered signals with a sampling frequency. Filter means 112 and sampling means 114 are drawn as separate functionalities but may be physically merged as explained above. Sampling means 114 comprises first holding means 116 for holding a first sample associated with a value of the X coordinate, and second holding means 118 for holding a second sample associated with a value of the Y coordinate. FIG. 1 shows a single filter means 112 connected to first and second holding means 116 and 118 via a single switch 120 controlled by a controller (not shown) in device 104. Filter means 112 may be comprised of a single low-pass filter. Alternatively, generator 110 may supply each respective one of the signals representing the X and Y coordinates to a respective one of a pair of low-pass filters that in turn have a respective output connected to a respective one of holding means 116 and 118. The rate at which each of holding means 116 and 118 is supplied with sample values is the sampling frequency. Filter control means 122 is provided to decrease at least temporarily a cut-off frequency of filter means 112 substantially below the sampling frequency.

Each of holding means 116 and 118 is permitted to retain its previous sample value and only needs to adapt to an increment or decrement for the next value, thus enabling the cut-off frequency to be lower than the sampling frequency. Filter control means 122 may simply fix the cut-off frequency at a value substantially below the sampling frequency. This, however, may hamper initialization of data entry, as the content of holding means 116 and 118 first has to be brought into the capture range for the short settling time required for decrements and increments. Preferably, filter control means 122 comprises contact detection means 124 for temporarily having the cut-off frequency raised to or above the sampling frequency when initializing contact between parts 106 and 108. This could be achieved by, for example, control of the duty cycle of the signal that controls switch 120.

Resistive tablet

Figure 2:
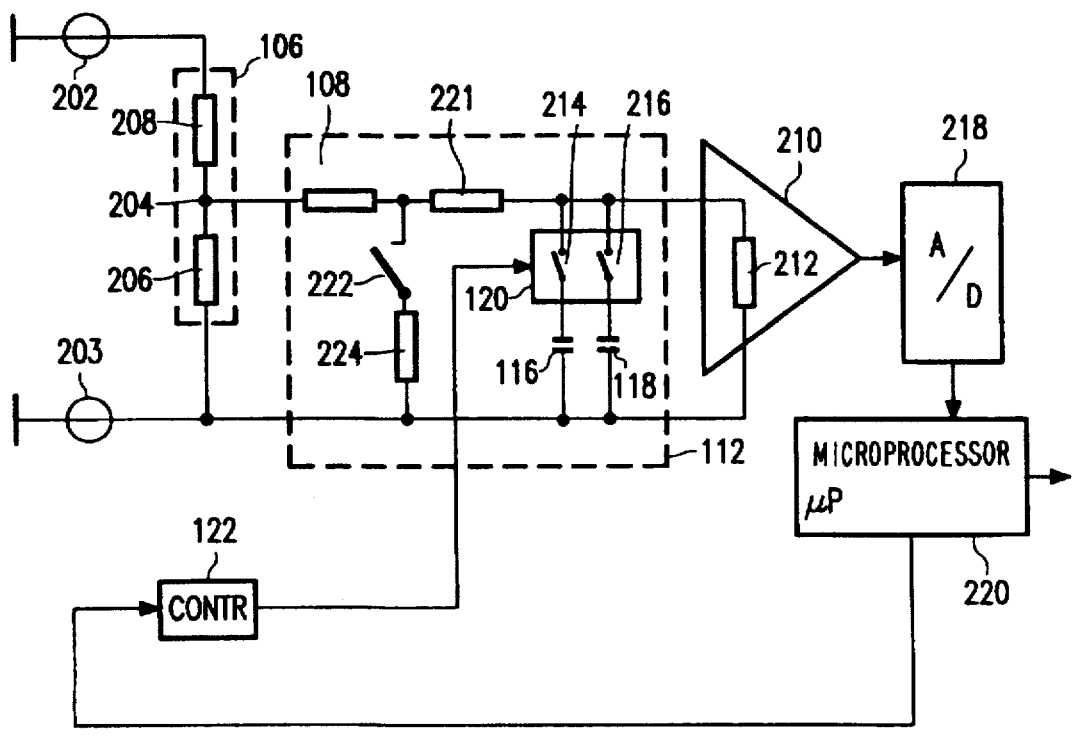
FIG. 2 is a diagram of a resistive tablet in the invention.

FIG. 2 is a diagram of a first example of an input device 200 for use in system 100 of FIG. 1. Device 200 is a resistive graphical tablet comprised of a resistive ATO layer 106 and a stylus 108, here electrically represented by its contact resistor 108. DC voltage sources 202 and 203 are controlled in operational use to establish a voltage gradient across ATO layer 106. Tablet 200 is operated upon by the user through stylus 108 that probes the voltage at a point of contact 204 with ATO layer 106. The X coordinate of the point of contact 204 between stylus 108 and ATO layer 106 has a voltage determined by the voltage divider made up of resistors 206 and 208 that represent portions of layer 106 at the left and right hand side of stylus 108. The resistances of resistors 206 and 208 depend on the location of point 204 relative to layer 106. A similar argument applies to the Y coordinate. Operation so far is well known in the art so that FIG. 1 shows only a single dimension of layer 106 in order to not obscure the drawing. Stylus 108 is electrically coupled to an amplifier 210, preferably having a high input impedance 212 to reduce the load. The voltage at contacting point 204 determines the voltage across input impedance 212 and, therefore, the output signal of amplifier 210. The output of amplifier 210 is connected to an A/D converter 218 whose output is supplied to a microcontroller 220. Microcontroller 220 thereupon furnishes data to PC 102.

Capacitors 116 and 118 are connected across impedance 212 through switches 214 and 216. Switches 214 and 216 are operated alternately to allow charge to accumulate on capacitors 116 and 118 that is representative of the X and Y coordinates, respectively, of point 204. Functionally, capacitors 116 and 118 serve both as holding means 116 and 118 illustrated in FIG. 1 and as an integral part of filter means 112. Capacitors 116 and 118 have capacitances of, e.g., 1–10 nF. Filter means 112 in device 200 is comprised of contact resistor 108 and capacitors 116 and 118 that are alternately connected to resistor 108. When stylus 108 physically contacts ATO layer 106, contact resistance 108 may vary between 1 ohm and 100K ohm due to surface irregularities of the contacting surfaces of stylus 108 and layer 106. The functional integration of resistor 108 with filter means 112 renders the bandwidth of filter means 112 dependent on the contact resistance 108. The bandwidth is reduced when contact resistance 108 increases. Thus the effects of contact noise are drastically reduced. A resistor 221 of, e.g., 10K ohm is inserted between stylus 108 and amplifier 210 to set an upper limit to the cut-off frequency.

Initial contact between stylus 108 and layer 106 is determined with help of a series connection of a switch 222 and a resistor 224 arranged in parallel to high input resistance 212 of amplifier 210, and with help of sources 203. Initially, the voltage of layer 106 is made uniformly high throughout layer 106 by appropriate control of sources 202 and 203. Switch 222 is turned on. When stylus 108 contacts layer 106, stylus 108 closes the electrical circuit and amplifier 210 experiences a detectable voltage jump as a sign that electrical contact has been made. Thereupon, switch 222 is turned off to start the coordinate detection as explained above. The effective cut-off frequency is changed during this operation by control of the duty cycle of the signals supplied by filter control means 122 to switches 120.

Filter control means 122 is shown as a separate feature. Note that filter control means 122, the control of switches 214, 216 and 222, and the control of voltage sources 202 and 203 may all be integrated in a single controller, e.g., controller 220, comprising dedicated control software.

Membrane tablet

Figure 3:
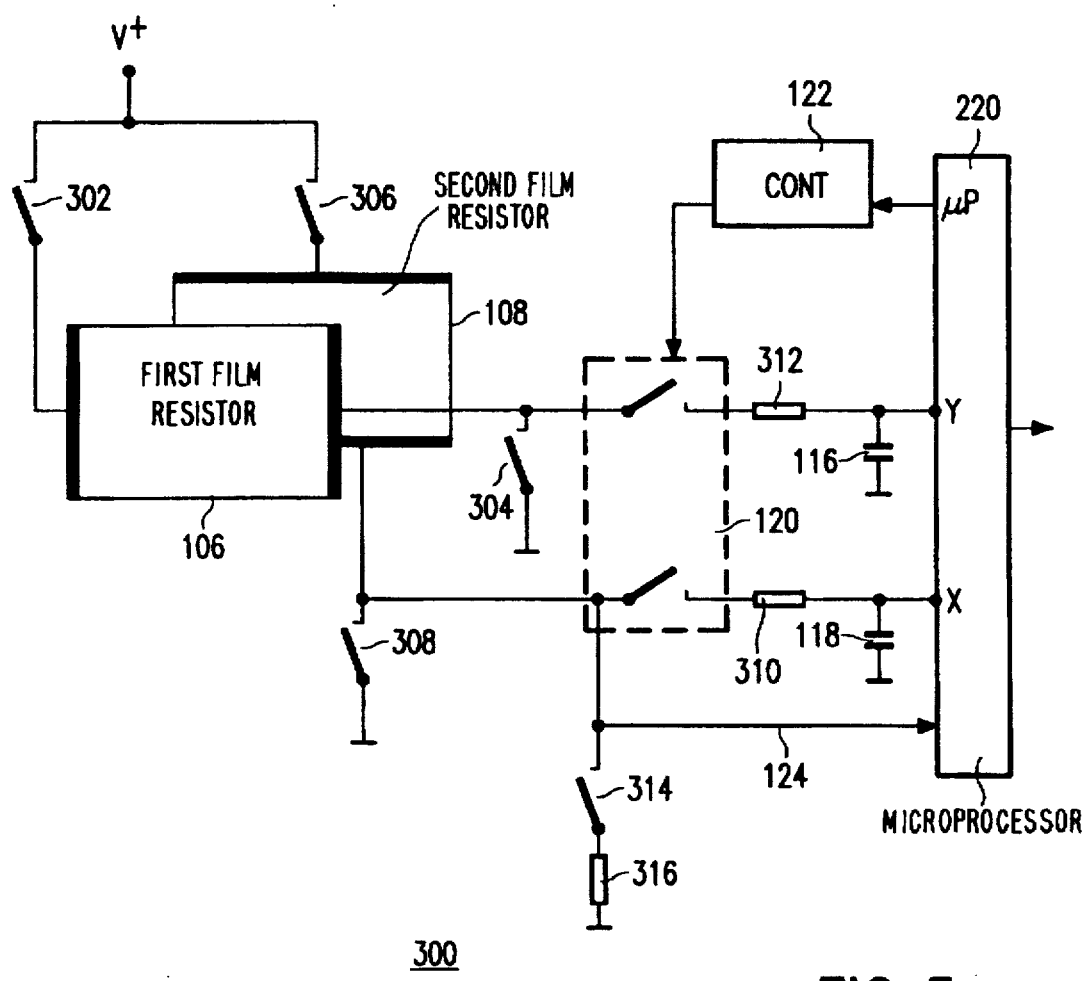
FIG. 3 is a diagram of membrane tablet in the invention.

FIG. 3 is a diagram of a second example of an input device 300 for use in system 100. Device 300 is a membrane graphical tablet comprised of a top film resistor 106 facing a bottom film resistor 108. In order to depress top film 106 to bring it into electrical contact with bottom film 108 a stylus (not shown) can be used. By pair-wise control of switches 302, 304, 306 and 308, a voltage gradient is established across one of film resistors 106 and 108, the other then being used to measure the voltage at a contact point. The measured signal voltages are representative of the coordinates of the point of contact. The signals are supplied via alternately controlled switches 120 to capacitors 116 and 118. Capacitors 116 and 118 function as holding means 116 and 118 of FIG. 1. In addition, capacitors 116 and 118 form filter means 112 together with the contact resistance of film resistors 106 and 108. Similar as to device 200 of FIG. 2, integrating the contact resistance in filter means 112 selectively reduces bandwidth with increasing resistance. Capacitors 116 and 118 have capacitances of, say, 100 nF. Additional resistors 310 and 312 of, e.g., 10K ohm, may be included to set a lower limit to the effective contact resistance. The voltages across capacitors 116 and 118 are supplied to controller 220, preferably via A/D converters (not shown).

Initial contact between film resistors 106 and 108 is detected via switch 314 and resistor 316 in, for example, the following manner. Initially, switches 120, 304, 306 and 308 are turned off and switch 314 is on. When switch 302 is on, film 106 is charged to a high voltage. Upon contact with film 108 a current will flow to ground via film 108, switch 314 and resistor 316. Resistor 316 has a resistance of, e.g., 10K ohm. The voltage across the series connection of switch 314 and resistor 316 is fed to controller 220 via an A/D converter (not shown) and is indicative of contact detection. Filter control means 122 thereupon is enabled to raise the effective the cut-off frequency, e.g., by control of the duty cycle of the signal governing switches 120. Thereupon, coordinate detection is started as explained above and after the first samples being acquired the effective cut-off frequency is lowered to well below the sampling frequency.

Filter control means 122 here is shown as a separate feature. Note that filter control means 122, and the control of switches 302, 304, 306, 308, 314 may all be integrated in controller 220 comprising dedicated control software.

What is claimed is:

1. A data processing system with a data input device for enabling entering respective data into the system upon user-interaction at respective first and second coordinates relative to the device, and wherein the device includes:

generating means for generating signals indicative of the first and second coordinates;

low-pass filter means for filtering of the signals;

sampling means for sampling of the filtered signals with a sampling frequency;

characterized in that the sampling means comprises:
first holding means for holding a first sample associated with a value of the first coordinate;
second holding means for holding a second sample associated with a value of the second coordinate;

the device comprises filter control means operative to set a cut-off frequency of the filter means initially to substantially at least the sampling frequency upon detection of the user-interaction and to subsequently decrease the cut-off frequency substantially below the sampling frequency.

2. The system of claim 1, wherein the first and second holding means are functionally and selectively merged with the low-pass filter means via first and second switches controlled via first and second control signals, respectively.

3. The system of claim 1, wherein the filter control means comprises means for temporarily having the cut-off frequency raised to or above the sampling frequency at initialization of the user-interaction.

4. The system of claim 2, wherein the filter control means comprises means for temporarily having an effective cut-off frequency raised to or above the sampling frequency at initialization of the user-interaction, the means being operative to control a duty-cycle of the control signals.

5. The system of claim 1, wherein the filter control means is operative to control the cut-off frequency in dependence on a noise-related quantity.

6. The system of claim 5, wherein:

the device includes a pair of parts operative to be brought into electrical contact with one another under user-interaction for enabling generation of the signals indicative of the first and second coordinates of the contact relative to the device;

the filter control means controls the cut-off frequency in dependence on a contact resistance of said parts.

7. The system of claim 6, wherein the filter control means comprises the contact resistance being functionally integrated with the low-pass filter means.

8. The system of claim 6, wherein the filter control means comprises means for temporarily having the cut-off frequency raised to or above the sampling frequency at initialization of contact between the parts.

9. The system of claim 8, wherein the filter control means comprises means for temporarily having an effective cut-off frequency raised to or above the sampling frequency at contact between the parts being initialized, the means being operative to control a duty-cycle of the control signals.

10. A data input device for use in the system of claim 1.

11. A data processing system with a data input device for enabling entering respective data into the system upon user-interaction at a coordinate relative to the device, and wherein the device includes:

generating means for generating signal indicative of the coordinate;

low-pass filter means for filtering of the signal;

sampling means for sampling of the filtered signal with a sampling frequency, wherein the sampling means comprises:

holding means for holding a sample associated with a value of the coordinate; and wherein the device comprises filter control means operative to set a cut-off frequency of the filter means initially to substantially at least the sampling frequency upon detection of the user-interaction and to subsequently decrease the cut-off frequency substantially below the sampling frequency.

* * * * *